US011392574B2

(12) United States Patent
Taubler et al.

(10) Patent No.: US 11,392,574 B2
(45) Date of Patent: Jul. 19, 2022

(54) MITIGATING RACE CONDITIONS ACROSS TWO LIVE DATASTORES

(71) Applicant: LendingClub Bank, National Association, Lehi, UT (US)

(72) Inventors: David Taubler, Oakland, CA (US); Hyunsuk Han, San Ramon, CA (US); Yana Nikitina, San Francisco, CA (US); Abhijit Karpe, Fremont, CA (US); Raul Acevedo, San Francisco, CA (US)

(73) Assignee: LendingClub Bank, National Association, Lehi, UT (US)

( * ) Notice: Subject to any disclaimer, the term of this patent is extended or adjusted under 35 U.S.C. 154(b) by 180 days.

(21) Appl. No.: 15/866,310

(22) Filed: Jan. 9, 2018

(65) Prior Publication Data

US 2019/0213270 A1    Jul. 11, 2019

(51) Int. Cl.
*G06F 16/00* (2019.01)
*G06F 7/00* (2006.01)
*G06F 16/23* (2019.01)
*G06F 16/21* (2019.01)
*G06F 16/27* (2019.01)

(52) U.S. Cl.
CPC ........ *G06F 16/2322* (2019.01); *G06F 16/214* (2019.01); *G06F 16/2308* (2019.01); *G06F 16/2358* (2019.01); *G06F 16/2365* (2019.01); *G06F 16/27* (2019.01)

(58) Field of Classification Search
CPC .... G06F 16/2365; G06F 16/27; G06F 16/273; G06F 16/2322; G06F 16/2308; G06F 16/214; G06F 16/2358

USPC ......................................................... 707/703
See application file for complete search history.

(56) References Cited

U.S. PATENT DOCUMENTS

| 5,924,095 | A  |   | 7/1999  | White   |             |
|-----------|----|---|---------|---------|-------------|
| 7,032,003 | B1 | * | 4/2006  | Shi     | H04W 99/00  |
|           |    |   |         |         | 707/999.01  |
| 2004/0230652 | A1 | * | 11/2004 | Estrada | H04L 65/403 |
|           |    |   |         |         | 709/204     |
| 2005/0015461 | A1 | * | 1/2005  | Richard | G06F 16/182 |
|           |    |   |         |         | 709/217     |
| 2013/0117229 | A1 | * | 5/2013  | Jain    | G06F 13/22  |
|           |    |   |         |         | 707/634     |

(Continued)

*Primary Examiner* — Raquel Perez-Arroyo
(74) *Attorney, Agent, or Firm* — Hickman Becker Bingham Ledesma LLP

(57) ABSTRACT

Techniques are described herein to handle situations in which multiple systems can change different copies of the same data item. Optimistic locking and time stamps are used to ensure consistency between the systems without incurring the performance penalties associated with two-phase commit. Specifically, when propagating a change to a data item from a first system to a second system, the second system compares the first system's "pre-update" value of the data item with its current value of the data item. If the pre-update value from the first system does not match the current value in the second system, then a conflict has occurred. Upon detecting a conflict, both systems use timestamps associated with the respective conflicting changes to determine which conflicting change "wins". The winning change is applied by all systems whose changes did not win.

17 Claims, 3 Drawing Sheets

(56) References Cited

U.S. PATENT DOCUMENTS

2014/0188798 A1 7/2014 Mackenzie et al.
2018/0322157 A1* 11/2018 Lee .................... H04L 67/1095

* cited by examiner

MITIGATING RACE CONDITIONS ACROSS TWO LIVE DATASTORES

FIELD OF THE INVENTION

The present invention relates to mitigating race conditions across two live datastores.

BACKGROUND

Large organizations often need to migrate their data from one datastore (DS1) to another (DS2). In many cases these datastores may have completely different schemas. Common data migration scenarios include but are not limited to:
  Migrating from an in-house datastore to a third-party datastore
  "Fixing" a cumbersome, legacy datastore schema with a newly designed schema
  Migrating a large datastore into multiple discreet datastores (common with "microservices")

Often, in an environment where a data migration operation is in progress, one datastore is designated the primary or source-of-truth, while the other becomes the secondary. For the purpose of explanation, it shall be assumed that during the migration of data from DS1 to DS2, DS1 is designated as the primary datastore. Consequently, during the migration operation, applications are expected to read and write from/to DS1. Any writes to DS1 would then be migrated asynchronously to DS2.

Unfortunately, it is not always possible for all applications to continue to read/write to the primary datastore. For example, in some situations, an organization's applications are be migrated from DS1 to DS2 before the data migration to DS2 is finished. Those applications that migrate to DS2 before completion of the migration will read and write to DS2, even though DS1 is the designated primary system. Thus, at any given point, some applications may be reading/writing from/to DS1, and others from/to DS2.

While the organization's services and applications are migrating from DS1 to DS2 as their source-of-truth, those applications will encounter scenarios where data is sometimes edited in DS1 and migrated to DS2, and sometimes edited in DS2 and migrated to DS1. If the same piece of information (e.g. John Doe's primary phone number) is simultaneously updated in a DS1 application and a DS2 application, then the data could become out of sync.

One approach for handling situations in which different copies of the same data item may be changed in multiple systems is referred to as "two-phase commit". In two-phase-commit, edits are coordinated across multiple remote datastores in a single transactional unit. Theoretically, each remote datastore would hold a transaction open for the duration of the two-phase commit, and each would only commit when all others have indicated that they are able to commit. Two-phase commit has a few problems, the primary one being prohibitively poor performance. Not only would simple operations now take a long time to execute, but precious database resources would become tied up and easily exhausted. In addition, two-phase commits are not completely reliable, as a datastore could theoretically indicate its ability to commit a transaction, but still fail to do so.

Another approach for handling situations in which different copies of the same data item may be changed in multiple systems is to have all applications write to a central stream, which would then propagate events to all the relevant systems (e.g. to both DS1 and DS2) for consumption. This stream can maintain ordering events, and centralize any required error handling. This approach works best when designing a new system. However, when an organization already has an existing infrastructure with many applications, the organization would simply face a version of the same problem: specifically, how to migrate all applications from DS1 to the "Master Stream" over time.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein to handle situations in which multiple systems can change different copies of the same data item. Optimistic locking and time stamps are used to ensure consistency between the systems without incurring the performance penalties associated with two-phase commit. The performance penalties are avoided by allowing all systems to independently and asynchronously make and commit changes without waiting for confirmation that all other systems are able to make and commit those same changes. Specifically, when propagating a change to a data item from a first system to a second system, the second system compares the first system's "pre-update" value of the data item with its current value of the data item. If the pre-update value from the first system does not match the current value in the second system, then a conflict has occurred. Specifically, the absence of a match indicates the second system had changed the item in a change to the data item that was not applied by the first system prior to the first system's change to the data item.

Upon detecting a conflict, both systems use timestamps associated with the respective conflicting changes to determine which conflicting change "wins". The winning change is applied by all systems whose changes did not win.

In cases where the systems do not have synchronized clocks, it is possible that a change that was actually made later than other changes is determined to be the "winning" change. Even when this occurs, the technique ensures that the systems stay consistent with each other because that later-made change would win in all systems and therefore be reflected by all systems. Those systems whose changes do not win may be notified, and corrective measures may be taken.

System Overview

Figure 1:
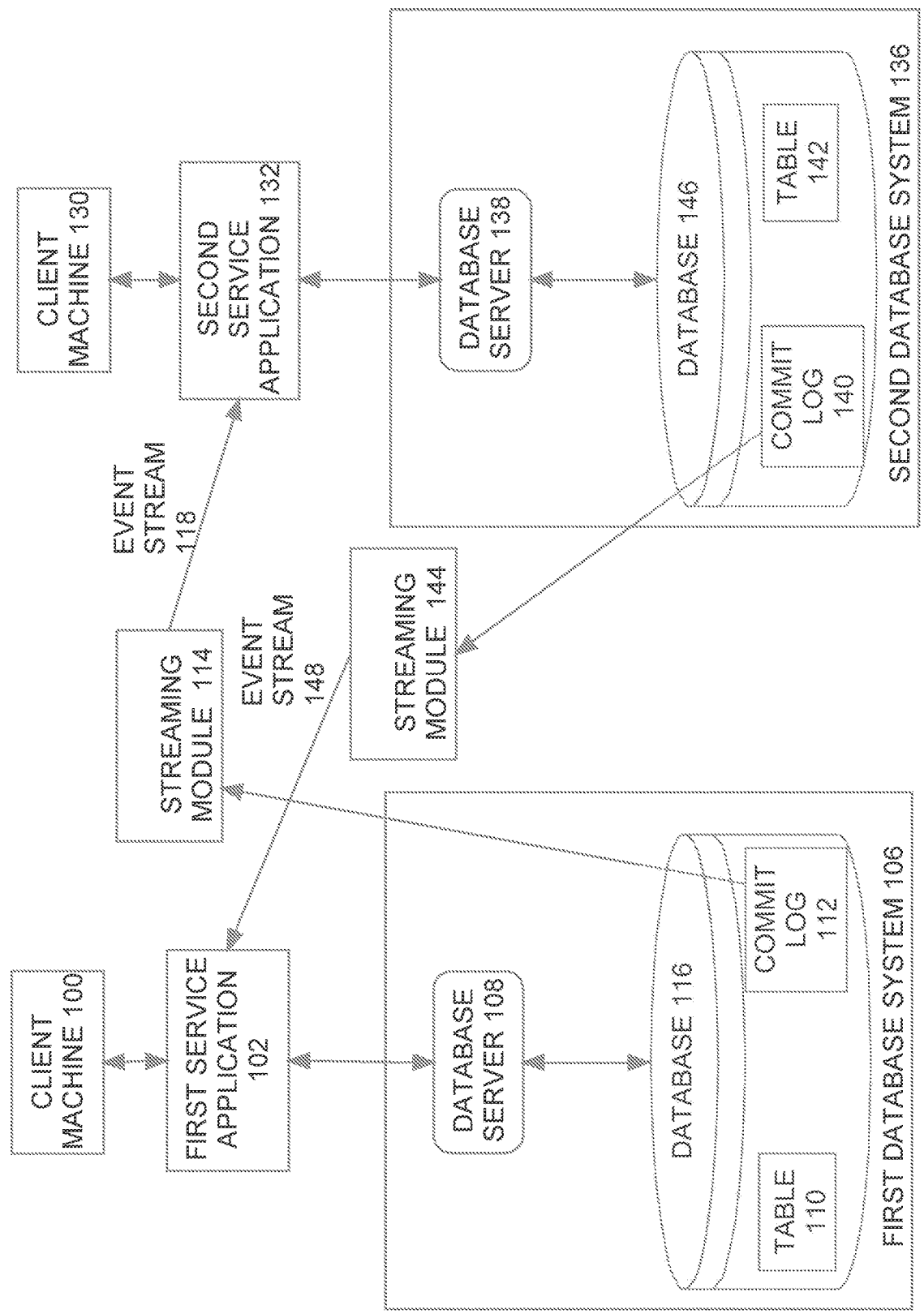
FIG. 1 is a block diagram of two systems that maintain distinct copies of the same data item, where each system is allowed to independently commit changes to that data item.

FIG. 1 is a block diagram illustrating two systems that have separate copies of a particular set of data. Both systems are configured to allow independent changes to that particular set of data, thereby giving rise to the possibility of conflicting changes to the same item.

The first system includes a first service application 102 that interacts with a first database system 106. Database system 106 includes a database server 108 and a database 116 that stores a table 110 and a commit log 112. Applications running on a client machine 100 may issue requests to the first service application 102 to cause changes to information in table 110. When those changes are made permanent in database 116, one or more entries are stored in commit log 112 about those changes. The commit log entries may include, among other things, the pre-change and post-change values of changes made to data items in table 110.

The second system includes a second service application 132 that interacts with a second database system 136. Database system 136 includes a database server 138 and a database 146 that stores a table 142 and a commit log 140. Applications running on a client machine 130 may issue requests to the second service application 132 to cause changes to information in table 142. When those changes are made permanent in database 146, one or more entries are stored in commit log 140 about those changes. The commit log entries may include, among other things, the pre-change and post-change values of changes made to data items in table 140.

For the purpose of explanation, it shall be assumed that table 110 is a copy of table 140. Thus, in order to remain consistent, the contents of table 110 should match those of table 140. It should be noted that, while a duplicated table is being used in the present example, the set of data that is common to both systems need not be at the table level of granularity. For example, the two systems may have different schemas, so the data items in table 110 are spread among multiple tables in database 146, or visa-versa. The techniques described herein apply to any set of data items whose respective copies must be maintained consistent between multiple systems, regardless of the schema in with those copies are stored in the respective systems.

In the systems illustrated in FIG. 1, committed changes made in database system 106 are propagated to database system 136 by a streaming module 114 that generates an event stream 118 based on information read from commit log 112. Similarly, committed changes made in database system 136 are propagated to database system 106 by a streaming module 144 that generates an event stream 148 based on information read from commit log 140. The streaming propagation of events may occur, for example, in the manner described in U.S. patent application Ser. No. 15/833,943, filed Dec. 6, 2017, the entire contents of which are incorporated herein by this reference. However, the techniques described herein are not limited to any particular manner of communicating committed changes between systems. For example, in an alternative embodiment, first service application 102 and second service application 132 may be designed to directly communicate committed changes to each other.

Conflicting Changes

For the purpose of explanation, it shall be assumed that tables 110 and 142 are copies of a "Persons" table. Since tables 110 and 142 are copies of the same table, the information contained therein will initially be the same. As mentioned above, database servers 108 and 138 are allowed to independently make changes to their respective copies of the same data items without the use of two-phase commit. Consequently, those changes may be made faster, but conflicting changes may occur.

For example, assume that, initially, both tables 110 and 142 have a row for a person named "Amanda Jones". An application running on client machine 100 may changes that person's last name from "Jones" to "Smith". Before the second service application 132 is aware of that change, an application running on client machine 130 may change that same person's last name from "Jones" to "Johnson". Both systems are allowed to commit those changes, creating a temporary inconsistency between the database systems 106 and 136. How those inconsistencies are identified and resolved shall now be described in greater detail.

Event Streams

In the systems illustrated in FIG. 1, event streams are the mechanism used to propagate changes between database systems 106 and 136. In the illustrated embodiment, the event streams 118 and 148 are generated based on the commit logs of the respective database systems 106 and 136. Consequently, each database system will only learn of changes made by the other database system after those changes have already been committed by the other database system.

According to one embodiment, the event streams 118 and 148 include not only the updated values of all changes made, but also previous values. For example, when second service application 132 is listening to event stream 118 and receives an event indicating that database system 106 changed Amanda Jones' name to Amanda Smith, the event stream 118 sent to second service application 132 includes both the initial value of the last name ("Jones") and the updated last name (e.g. "Smith").

In response to receiving the event that indicates that database system 106 changed "Jones" to "Smith", the second service application 132 attempts to make the same change in database system 136. If a race condition does not exist, then the last-name value that second service application 132 is about to replace should match the initial value ("Jones") passed by event stream 118. The following is an example of a query that can be used to test for a match between (a) the pre-value in the event stream, and (b) the current value in database 146, and to make the appropriate change if there is a match:

update PERSON set LAST_NAME='Smith' where ID=234567 and LAST_NAME='Jones';

In this example, the condition "where ID=234567" selects the row of table 142 that corresponds to the person (Amanda Jones) whose name is being changed. The condition "LAST_NAME='Jones'" is only satisfied if the current value in the LAST_NAME column of that row is "Jones". If the current value in the LAST_NAME column of that row is "Jones", then the condition is satisfied and the update is performed. If a race condition exists (e.g. second service application 132 has already updated the last name to "Johnson"), then the current value in the LAST_NAME column of that row would not be Smith, and the update would not be performed.

Using Timestamps to Resolve Conflicts

Unfortunately, optimistic locking with pre- and post-values is not sufficient to maintain data consistency between multiple systems. For example, in the scenario described above, preventing "Johnson" from being overwritten by "Smith" in the relevant row of table 142 results in a situation in which the row in table 142 contains the last name "Johnson" and the corresponding row in table 110 contains the last name "Smith". Therefore, according to one embodiment, timestamps are used in conjunction with optimistic locking to ensure that both database systems 106 and 136 end up with the same values for their respective copies of common data items.

For the purpose of explanation, assume that the clocks used by database systems 106 and 136 are nearly identical. Timestamps can be used to help ensure eventual consistency by ensuring that any data-change event that is received by any given system is processed only if that system did not receive a more recent update to that same piece of data. For example, consider the data-change record received by second service application 132 that indicates that database system 106 changed "Jones" to "Smith". If the function ts(e) refers to the timestamp of event e, then for any event A originating from database system 106 and any event B that occurred in database system 136 involving the same data, database system 136 would perform the following:

```
if ts(A) <= ts(B)
    do nothing
else (if ts(A) > ts(B))
    overwrite B with A
```

In one embodiment, the values for this test are obtained by examining the DATE_MODIFIED value on the table representing the entity being modified. For example, if an attribute of John Doe's primary email address is modified in both spots, then database system 136 could execute the following command to obtain the desired timestamp:
select DATE_MODIFIED from EMAIL_ADDRESS where ID=<john-doe's-primary-email-addr-id>

Once obtained, database system 136 compares that timestamp with the timestamp of the incoming event, and only processes the incoming event if the timestamp of the incoming event is more recent than the DATE_MODIFIED value associated with the targeted row. In an alternative embodiment, the condition "DATE_MODIFIED<=<tlc-event-commit-timestamp>" can be added to the update command that is executed by database server 138 in response to the data-change event. If executing the command results in zero updates, then a race condition was detected and the conflicting update made by database system 136 "wins" (in which case the targeted row ends up with the lastname "Johnson" in both systems). On the other hand, if executing the command results in one update, then either no race condition was detected, or a race condition occurred and the update made by database system 106 "wins" (in which case the targeted row ends up with the lastname "Smith" in both systems).

The same logic would be applied by all systems that contain copies of the changed data item. Thus, in the example given above where event A (changing LAST_NAME to "Smith") originates from database system 106 and event B (changing LAST_NAME to "Johnson") originates from database system 136, the logic applied by database system 106 would be:

```
if ts(B) <= ts(A)
    do nothing
```

```
else (if ts(B) > ts(A))
    overwrite A with B
```

Assuming that the same timestamps are used for comparison on each side for any pair of competing updates, the same update should win on each side, ensuring that all systems stay in sync. For this reason, clocks on each system do not need exact synchronization.

Unfortunately, relying solely on timestamps to resolve conflicting updates has drawbacks. For example, the DATE_MODIFIED may be maintained at coarser granularity than the update. Thus, modification to a different attribute of "Amanda Jones", such as a phone number, may result in a DATE_MODIFIED value that does not reflect the time that the LAST_NAME attribute was modified.

In addition, it might not be feasible to compare using the same literal timestamps on each side. When second service application 132 receives an event that reflects a change made by first database system 106 (an "ES1 event"), second service application 132 would compare the commit timestamp of the ES1 event with the DATE_MODIFIED timestamp of the table in database system 136 to be updated. Similarly, when first service application 102 receives the corollary event that reflects the change made by second database system 136 (an "ES2 event"), first service application 102 would compare the commit timestamp of the ES2 event with the DATE_MODIFIED timestamp of the table in database system 106 to be updated. While the commit timestamps and DATE_MODIFIED timestamps should be within milliseconds of each other, theoretically it could result in both systems determining that they should accept (or both reject) their events.

Combining Pre-Value Checks with Timestamp Checks

Figure 2:
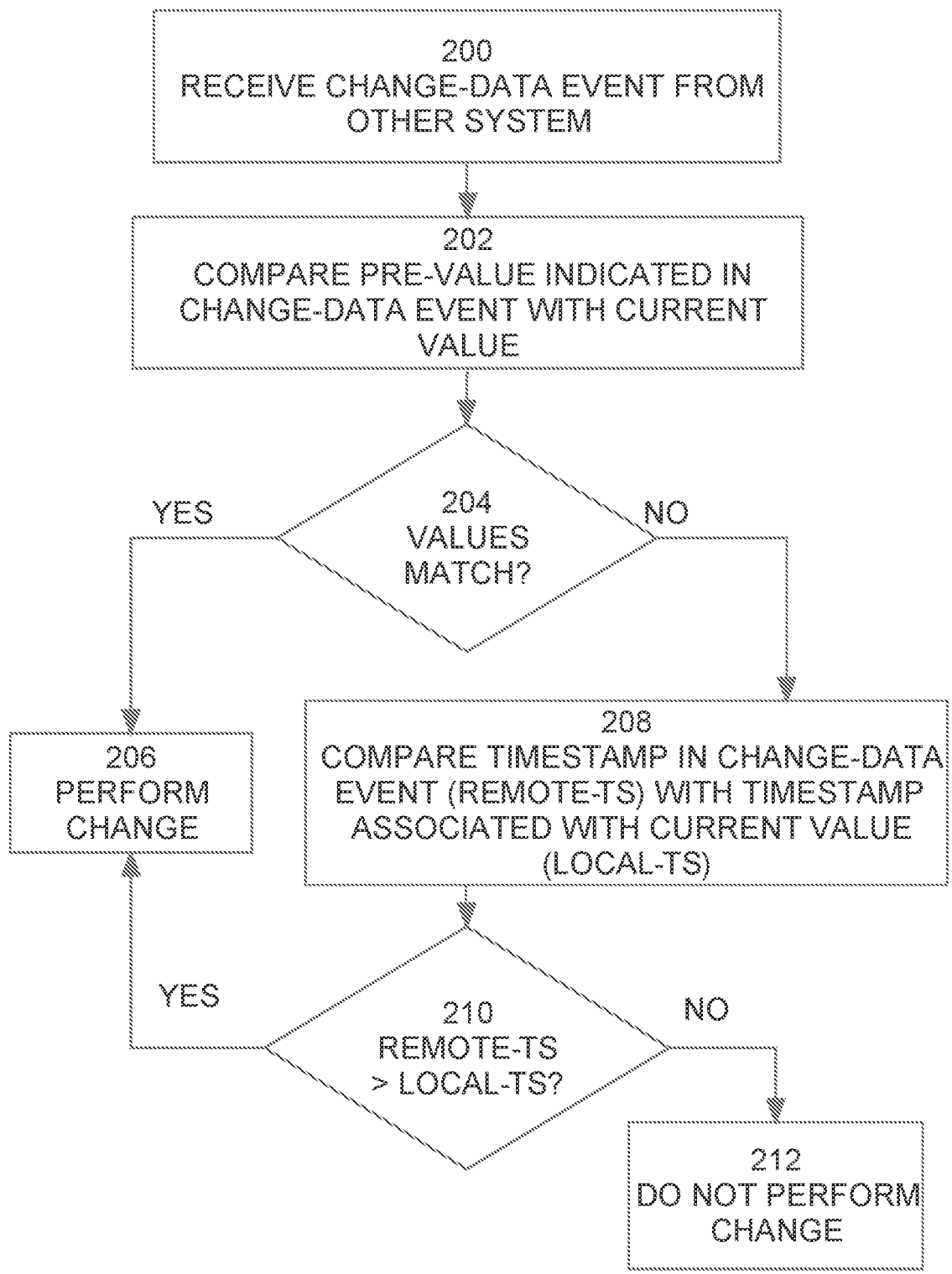
FIG. 2 is a flowchart illustrating steps performed by each system to ensure consistency in the presence of conflicting committed updates.

According to an embodiment, the deficiencies of ensuring consistency only with pre-value check, and of ensuring consistency with only timestamp checks, are addressed by a technique that combines both pre-value checks and timestamp checks. Referring to FIG. 2, it is a flowchart illustrating steps performed by each system that receives a remote event from another system, in order to ensure consistency between the systems.

In step 200 a system receives a change-data event from another system. For the purpose of explanation, it shall be assumed that second service application 132 receives a change-data event for a change, made in first database system 106, of Amanda Jones' last name from "Jones" to "Smith".

At step 202, the pre-value indicated in the change-data event is compared to the current value for that same piece of data in the system that received the change-data event. In the present example, at step 202, second service application 132 compares the pre-value "Jones" from the change-data event against the current LAST_NAME value for that same person in table 142.

At step 204, if the values match, then control proceeds to step 206 and the system that received the change-data event makes the change indicated in the change-data event. In the present example, if the values match, second service application 132 causes database server 138 to update "Jones" to "Smith" in the relevant row of table 142.

On the other hand, if the values do not match, control proceeds from step 204 to step 208. In the present example, if the current value of the relevant person is not "Jones", then control would proceed to step 208. The current value many not match, for example, if an application on client machine 130 has updated the last name of "Amanda Jones" from "Jones" to "Johnson", and that update had not been applied by database system 106 prior to the update, within database system 106, of the last name to "Smith".

In step 208, the timestamp in the change-data event (the "remote-TS") is compared to the timestamp (the "local-TS") associated with the to-be-updated value in the system that received the change-data event. If the remote-TS is greater (more recent than) the local-TS, then control proceeds to step 206 and the change indicated in the change-data event is performed. On the other hand, if the remote-TS is not greater than the local-TS, then control proceeds to step 212 and the change is not performed. Optionally, when an update conflict is resolved, an alert may be generated to indicate that the "losing" conflicting change, even though previously committed in one system, was overwritten by the "winning" conflicting change. In some embodiments, such an alert may trigger remedial measures.

In the present example, if the remote-TS for changing "Jones" to "Smith" is more recent than the local-TS associated with the "Johnson" value, then "Johnson" is overwritten with "Smith" at step 206. Otherwise, "Johnson" is not overwritten with "Smith".

Significantly, in the case of conflicting updates, both systems will execute the same logic to determine the winner, and therefore will arrive at the same conclusion. Thus, if database system 136 determines not to overwrite "Johnson" with "Smith", then database system 106 will decide to overwrite "Smith" with "Johnson" in response to the change-event that first service application 102 receives from second database system 136. Consequently, if one system ends up with the name "Johnson", then all systems will ultimately reflect the last name "Johnson".

As another example, assume that the object that is being modified by two systems (system A and system B) is an object of type "Person" that has the fields: First Name, Last Name, Phone Number. Assume further that the object has an ID of 123, and that the first name is initially "John". Assume that system A changes "John" to "Ivan", and system B changes "John" to "Juan".

In an embodiment in which the database clocks are synchronized, the database commit timestamps are used to order events. There are a number of techniques that can be used to synchronize database clocks. One technique to achieve clock synchronization is to emit a "heartbeat" event that will be persisted in all participating (i.e. observed database systems). In one embodiment, in the rare event of the race condition, the initiating user of the conflicting update is notified.

Unsynchronized Clocks

Various mechanisms are available for synchronizing the clocks of disparate systems. When any such mechanism is used to synchronize the clocks of database systems 106 and 136, the conflicting update that both systems adopt will be the most recent update. Thus, both systems will reflect "Smith" if the change to "Smith" in database system 106 actually occurred before the change to "Johnson" in database system 136, and both system will reflect "Johnson" if the change to "Johnson" in database system 136 occurred before the change to "Smith" in database system 106.

In situations where the system clocks are unsynchronized, the "winning" conflicting change may have actually occurred before the "losing" conflicting change. For example, if the clock of database system 106 is behind that of database system 136, the "winning" conflicting change may be "Johnson" even though the change to "Smith" in database system 106 occurred after the change to "Johnson" in database system 136. However, even in such situations, consistency between the two systems is maintained, because both systems pick the same winning conflicting change.

For example, if system A changes "John" to "Ivan" at time T10 (according to system A's clock), and system B changes "John" to "Juan" at time T12 (according to system B's clock), then the remote event received by system A will indicate T12 as the time of system B's change, and the remote event received by System B will indicate T10 as the time of system A's change.

System A will compare T10 to T12 and decide not to change the value (it stays at "Ivan"), while System B compares T10 to T12 and changes the value (from "Juan" to "Ivan"). Thus, both system will ultimately reflect the same value "Ivan", whether or not time T10 in system A was actually before time T12 in system B.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
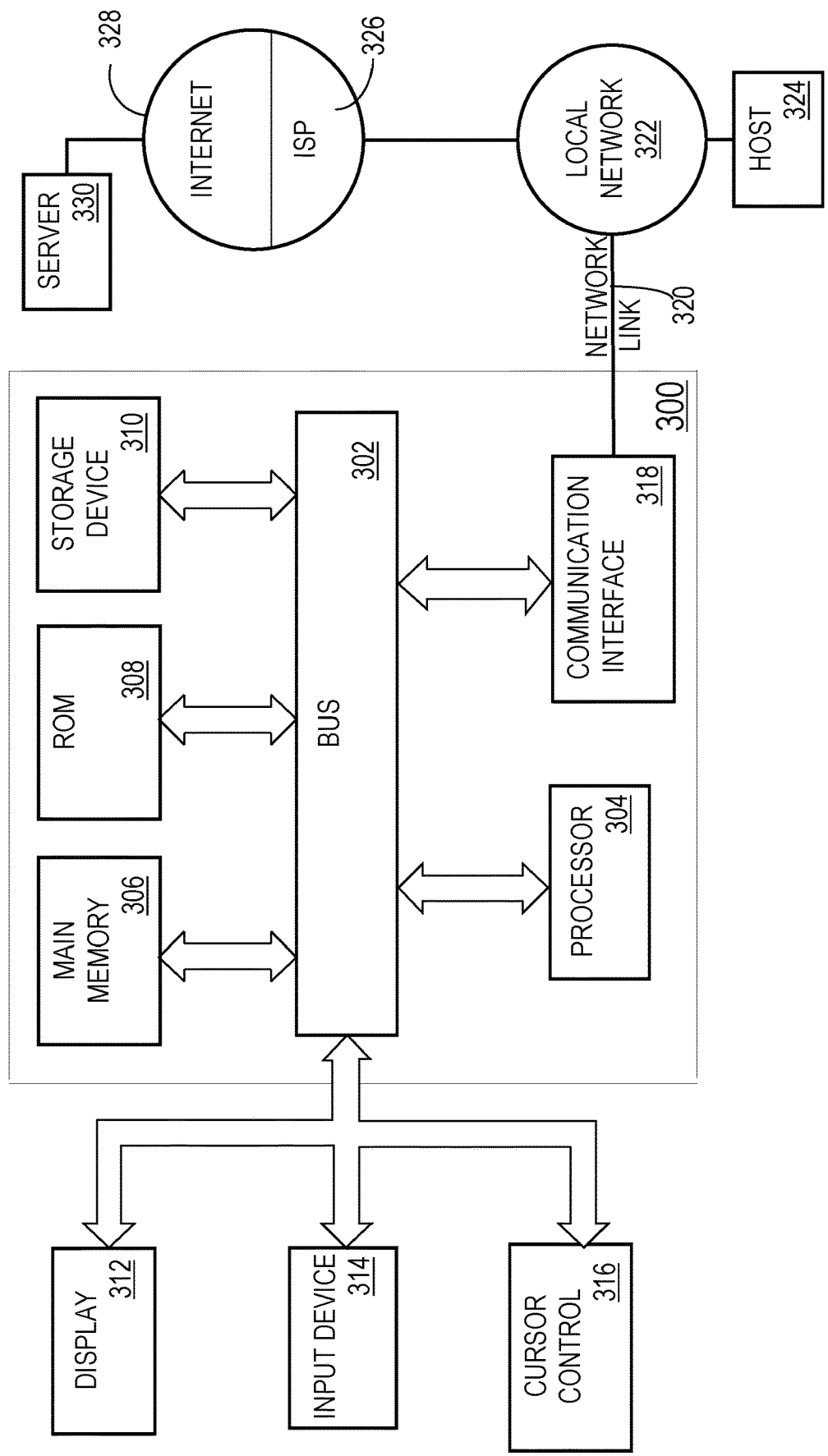
FIG. 3 is a block diagram of a computer system that may be used to implement the techniques described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining a first copy of one or more data items in a first system that comprises a first set of one or more computing devices;
   maintaining a second copy of the one or more data items in a second system that comprises a second set of one or more computing devices;
   allowing the first system and the second system to independently commit updates to their respective copies of a first data item and a second data item of the one or more data items;
   receiving, at the first system, first information indicating that the second system committed an update to its copy of the first data item, wherein the first information includes a first pre-value that identifies a value of the second system's copy of the first data item before the update to the first data item was committed and a first updated value that identifies a value of the second system's copy of the first data item after the update to the first data item was committed;

in response to the first system receiving the first information:

determining that the first pre-value does not match a current value of the first data item within the first system;

in response to determining that the first pre-value does not match the current value of the first data item within the first system:

comparing, at the first system, a local timestamp associated with the first data item with a remote timestamp associated with the first data item; and updating the first data item at the first system to the first updated value only when the local timestamp represents a point in time that is older than a point in time represented by the remote timestamp;

receiving, at the first system, second information indicating that the second system committed an update to its copy of the second data item, wherein the second information includes a second pre-value that identifies a value of the second system's copy of the second data item before the update of the second data item was committed and a second updated value that identifies a value of the second system's copy of the second data item after the update of the second data item was committed;

in response to the first system receiving the second information:

determining, at the first system, that the second pre-value associated with the committed update to the second system's copy of the second data item matches a current value of the second data item within the first system.

2. The method of claim 1 wherein (a) the local-timestamp associated with the first data item and (b) the remote-timestamp associated with the first data item are generated by clocks that are synchronized.

3. The method of claim 1 wherein (a) the local-timestamp associated with the first data item and (b) the remote-timestamp associated with the first data item are generated by clocks that are not synchronized.

4. The method of claim 1 further comprising generating the first information based on entries in a commit log of a database used by the second system.

5. The method of claim 4 wherein an event record includes the remote-timestamp associated with the first data item.

6. The method of claim 1 wherein the local-timestamp associated with the first data item is a commit time of a most recent change to the first data item in the first system.

7. The method of claim 1 wherein: the first copy of the first data item is stored according to a first schema; the second copy of the first data item is stored according to a second schema; and the first schema is different from the second schema.

8. The method of claim 1 wherein: the first copy of the first data item is stored in a particular table maintained in the first system; and the second copy of the first data item is stored in a plurality of tables maintained in the second system.

9. One or more non-transitory computer-readable media storing one or more sequences of instructions that, when executed by one or more computing devices, cause:

maintaining a first copy of one or more data items in a first system that comprises a first set of one or more computing devices;

maintaining a second copy of the one or more data items in a second system that comprises a second set of one or more computing devices;

allowing the first system and the second system to independently commit updates to their respective copies of a first data item and a second data item of the one or more data items;

receiving, at the first system, first information indicating that the second system committed an update to its copy of the first data item, wherein the first information includes a first pre-value that identifies a value of the second system's copy of the first data item before the update to the first data item was committed and a first updated value that identifies a value of the second system's copy of the first data item after the update to the first data item was committed;

in response to the first system receiving the first information:

determining whether the first pre-value matches a current value of the first data item within the first system;

in response to determining that the first pre-value does not match the current value of the first data item within the first system:

comparing, at the first system, a local timestamp associated with the first data item with a remote timestamp associated with the first data item; and updating the first data item at the first system to the first updated value only when the local timestamp represents a point in time that is older than a point in time represented by the remote timestamp;

receiving, at the first system, second information indicating that the second system committed an update to its copy of the second data item, wherein the second information includes a second pre-value that identifies a value of the second system's copy of the second data item before the update of the second data item was committed and a second updated value that identifies a value of the second system's copy of the second data item after the update of the second data item was committed;

in response to the first system receiving the second information:

determining, at the first system, that the second pre-value associated with the committed update to the second system's copy of the second data item matches a current value of the second data item within the first system.

10. The one or more non-transitory computer-readable media of claim 9 wherein (a) the local-timestamp associated with the first data item and (b) the remote-timestamp associated with the first data item are generated by clocks that are synchronized.

11. The one or more non-transitory computer-readable media of claim 9 wherein (a) the local-timestamp associated with the first data item and (b) the remote-timestamp associated with the first data item are generated by clocks that are not synchronized.

12. The one or more non-transitory computer-readable media of claim 9, wherein the one or more sequences of instructions further comprise instructions that, when executed by the one or more computing devices, cause: generating the first information based on entries in a commit log of a database used by the second system; wherein the first information includes the remote-timestamp associated with the first data item.

13. The one or more non-transitory computer-readable media of claim 9 wherein the local-timestamp associated with the first data item is a commit time of a most recent change to the first data item.

14. The one or more non-transitory computer-readable media of claim 9 wherein the remote-timestamp associated with the first data item is a commit time of the committed update associated with the first data item made by the second system.

15. The one or more non-transitory computer-readable media of claim 9 wherein: the first copy of the first data item is stored according to a first schema; the second copy of the first data item is stored according to a second schema; and the first schema is different from the second schema.

16. The one or more non-transitory computer-readable media of claim 9 wherein: the first copy of the first data item is stored in a particular table maintained in the first system; and the second copy of the first data item is stored in a plurality of tables maintained in the second system.

17. A plurality of computing systems, wherein each computing system includes one or more computing devices, the plurality of computing systems comprising:
  a first system that maintains a first copy of a first data item and a second data item; and
  a second system that maintains a second copy of the first data item and the second data item;
  wherein the first system and the second system independently commit updates to their respective copies of the first data item and the second data item;
  wherein the first system is configured to resolve update conflicts in response to receiving, at the first system, first information indicating that the second system committed an update to its copy of the first data item, wherein the first information includes a first pre-value that identifies a value of the second system's copy of the first data item before the update to the first data item was committed and a first updated value that identifies a value of the second system's copy of the first data item after the update to the first data item was committed, by:
    determining, at the first system, whether the first pre-value associated with the committed update to the second system's copy of the first data item matches a current value of the first data item within the first system;
    in response to determining, at the first system, that the first pre-value does not match the current value of the first data item within the first system:
      comparing, at the first system, a local timestamp associated with the first data item with a remote timestamp associated with the first data item; and
      updating the first data item at the first system to the first updated value only when the local timestamp represents a point in time that is older than a point in time represented by the remote timestamp;
  wherein the first system is configured to, in response to receiving second information indicating that the second system committed an update to its copy of the second data item, wherein the second information includes a second pre-value that identifies a value of the second system's copy of the second data item before the update of the second data item was committed and a second updated value that identifies a value of the second system's copy of the second data item after the update of the second data item was committed:
    determine, at the first system, that the second pre-value associated with the committed update to the second system's copy of the second data item matches a current value of the second data item within the first system.

* * * * *